United States Patent [19]

Bösch

[11] 4,142,605
[45] Mar. 6, 1979

[54] CASTING FOR MUFFLING SOUND CONDUCTED THROUGH SOLIDS AND METHOD FOR ITS PRODUCTION AND ITS USE

[75] Inventor: Norbert Bösch, Arbon, Switzerland

[73] Assignee: Adolph Saurer Limited, Arbon, Switzerland

[21] Appl. No.: 829,058

[22] Filed: Aug. 30, 1977

[30] Foreign Application Priority Data

Sep. 1, 1976 [CH] Switzerland .................... 11058/76

[51] Int. Cl.² .................................... G10K 11/00
[52] U.S. Cl. .................................... 181/204
[58] Field of Search ............. 181/204, 202, 223, 224, 181/229, 282; 164/111, 94, 93, 95, 98

[56] References Cited

U.S. PATENT DOCUMENTS

| | | | |
|---|---|---|---|
| 2,005,338 | 6/1935 | Frost | 164/111 |
| 3,090,463 | 5/1963 | Yanda | 181/204 |
| 3,563,300 | 2/1971 | Honda | 164/94 |
| 3,709,772 | 1/1973 | Rice | 164/98 |
| 3,882,951 | 5/1975 | Conley | 181/204 |
| 4,048,366 | 9/1977 | Kingsbury | 181/204 |

*Primary Examiner*—L. T. Hix
*Assistant Examiner*—Benjamin R. Fuller
*Attorney, Agent, or Firm*—Bailey, Dority & Flint

[57] ABSTRACT

The present invention is related to a casting for muffling sound conducted through solids and reducing noise in internal combustion engines and to a method for production of the casting.

2 Claims, 1 Drawing Figure

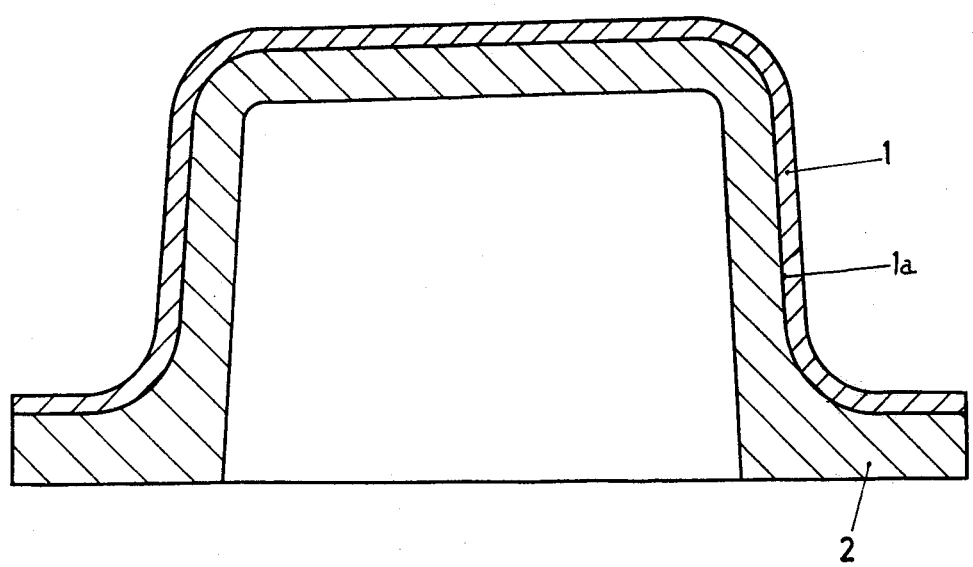

CASTING FOR MUFFLING SOUND CONDUCTED THROUGH SOLIDS AND METHOD FOR ITS PRODUCTION AND ITS USE

BACKGROUND OF THE INVENTION

Combustion in internal combustion engines produces vibratory forces which release sound waves. The sound waves are conducted through solids to adjacent structural parts and expand to the engine surface. The amplitude of the sound waves is dependent upon the mechanical impedances of the transmission path and upon the stimulated structural parts. The total movements of the sound waves are transformed according to the amplitude of radiation on the engine surface into sound transmitted by air and produce the audible and measurable engine noise.

Measures are known by which the oscillations of the structural parts surfaces can be reduced thereby reducing the radiation of sound transmitted by air. One particular solution has been proposed (MTZ 36 (1975) 5, p. 155) by which the surfaces of the most radiating structural parts are covered with muffling material.

The disadvantage of this solution is the very expensive application of muffling material, particularly onto structural parts of complicated form, as well as the vulnerability of nonmetallic muffling materials.

The present invention proposes an entirely different method for lowering the engine noise emissions.

SUMMARY OF THE INVENTION

It has been found that engine noise in a combustion engine may be reduced by providing a multi-layer casting to cover the various operating parts of the engine such as in the form of a cylinder head cover, crankcase cover, and the like. The casting includes adjacent layers lying directly and tightly against one another without any solid connection passing through the layers.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is an end cross-sectional view illustrating a multi-layered cylinder head cover constructed in accordance with the invention.

DESCRIPTION OF A PREFERRED EMBODIMENT

The invention relates to a multi-layered casting for muffling sound and, more particularly, relates to the reduction of engine noises by providing covers for the operating parts of internal combustion engines by casting the covers in at least two layers according to the invention.

Since the multi-layered casting is essentially the same for the covers such as cylinder head covers, crankcase covers, oil sump covers and the like, only one such cover is illustrated in the drawing with the understanding that other covers for the various parts of the engines may also be made according to the invention.

Accordingly, FIG. 1 illustrates a cross-sectional view of a cylinder head cover constructed in accordance with the present invention.

The invention is based on the bending and dampening of sound waves emanating from the structural walls of the engine and for reducing the radiation of sound. The casting according to the invention makes the resistance to bending or the elasticity modulus of the plate material dissipative of the sound. The dissipation of sound radiation is achieved by a multi-layered casting which includes in the preferred form a casting including an outer shell 1 and an inner shell 2. These shells are casted one on the other and lie tightly together. However, on account of the formation of an oxidation layer 1a formed by the hardening of the first shell 1, the shells 1 and 2 are not connected with each other except, at the most, touching at points. Thus, the layers 1 and 2 are generally out of metallic contact with one another increasing the sound muffling capacity of the casting as a cover. The surfaces of the shells 1 and 2 which are tightly against each other are without any intermediate medium between them and are held together by the small unevenness in the contact surfaces caused by finishing. The shells 1 and 2 may be cast in any conventional manner from any suitable metal.

The first casting shell 1 is used as the mold for casting the second shell 2. It is also contemplated that more than two layers could be provided whereby each shell serves as the mold for the subsequent layer or shell. The two cast shells 1 and 2 can consist of the same or of different materials. Because of heat expansion, uniformity of material for the two layers is preferred. To obtain the desired effect, it is also conceivable to cast in scraps or to use a compression sheetmetal shell instead of the first casting shell 10.

Thus, it can be seen that an advantageous construction for noise reducing wall structures for covers for the cylinder heads, crankcases, oil sumps, and the like for internal combustion engines can be had by casting multi-layer covers in accordance with the invention.

While a preferred embodiment of the invention has been described using specific terms, such description is for illustrative purposes only, and it is to be understood that changes and variations may be made without departing from the spirit or scope of the following claims.

What is claimed is:

1. In an internal combustion engine, a sound muffling cover for covering various operating parts of said engine such as for covering the cylinder head, crankcase, oil sump and the like, comprising:

a unitary multi-layer casting including a first casted metal layer;

a second casted metal layer lying atop said first layer;

an oxidation layer intermediate said first and second layers; and said first and said second layers being separated by said oxidation layer and generally out of metallic contact with one another affording dissipation of sound radiation by said casting as a cover.

2. The sound reducing cover set forth in claim 1 wherein the second layer is cast and used as a casting mold for the casting of the first mentioned layer.

* * * * *